United States Patent [19]
Ebner et al.

[15] 3,691,546
[45] Sept. 12, 1972

[54] VARIABLE RELUCTANCE TRANSMITTER
[72] Inventors: Craig E. Ebner, Ambler; Jeffry V. Markley, Sellersville, both of Pa.
[73] Assignee: Ametek, Inc., New York, N.Y.
[22] Filed: April 29, 1970
[21] Appl. No.: 32,830

[52] U.S. Cl..................................340/196, 336/107
[51] Int. Cl. ............................................G08c 19/08
[58] Field of Search.............................340/199, 196

[56] References Cited

UNITED STATES PATENTS

| | | | |
|---|---|---|---|
| 2,494,621 | 1/1950 | Jones | 340/199 |
| 2,641,742 | 6/1953 | Wolfe | 240/199 |
| 3,099,823 | 7/1963 | Bobula | 340/199 |
| 3,127,555 | 3/1964 | Honore | 340/199 |
| 2,623,940 | 12/1952 | Templeman | 340/196 |
| 2,568,587 | 9/1951 | MacGeorge | 340/199 |
| 2,849,668 | 8/1958 | Tripp | 340/199 |
| 2,880,407 | 3/1959 | Comstock | 240/199 |
| 3,471,934 | 10/1969 | Miller | 340/199 |

Primary Examiner—Thomas B. Habecker
Attorney—Smythe & Moore

[57] ABSTRACT

A variable reluctance transmitter is disclosed wherein a pair of axially positioned coils have annular magnetic pole members on their inner peripheries, and an armature member of magnetic material moves linearly within the pole members. Sensor means moves the armature within the pole members and electrical means are provided for adjusting selectively the voltage range transmitted by the movement of the armature within the coils.

2 Claims, 7 Drawing Figures

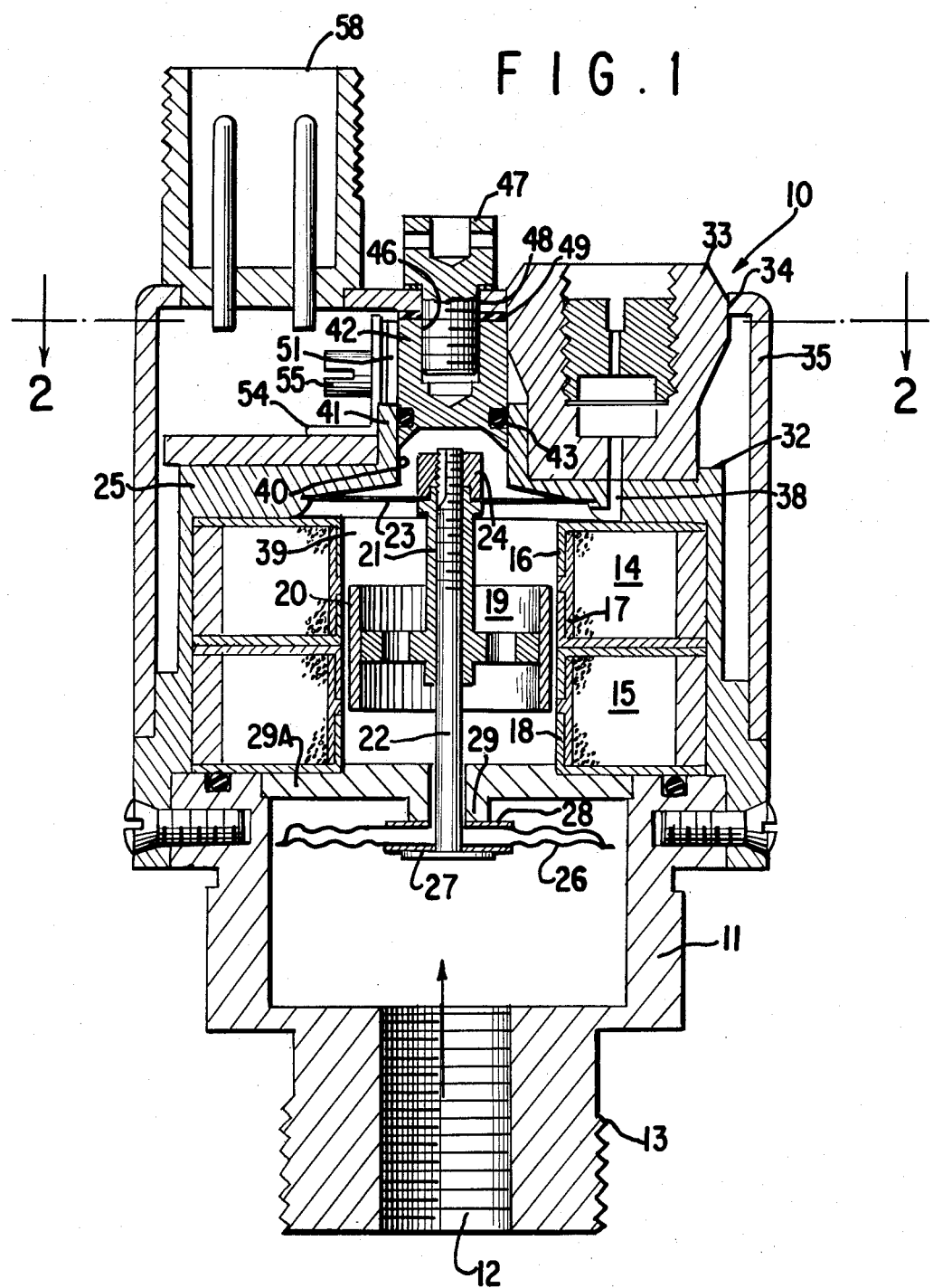

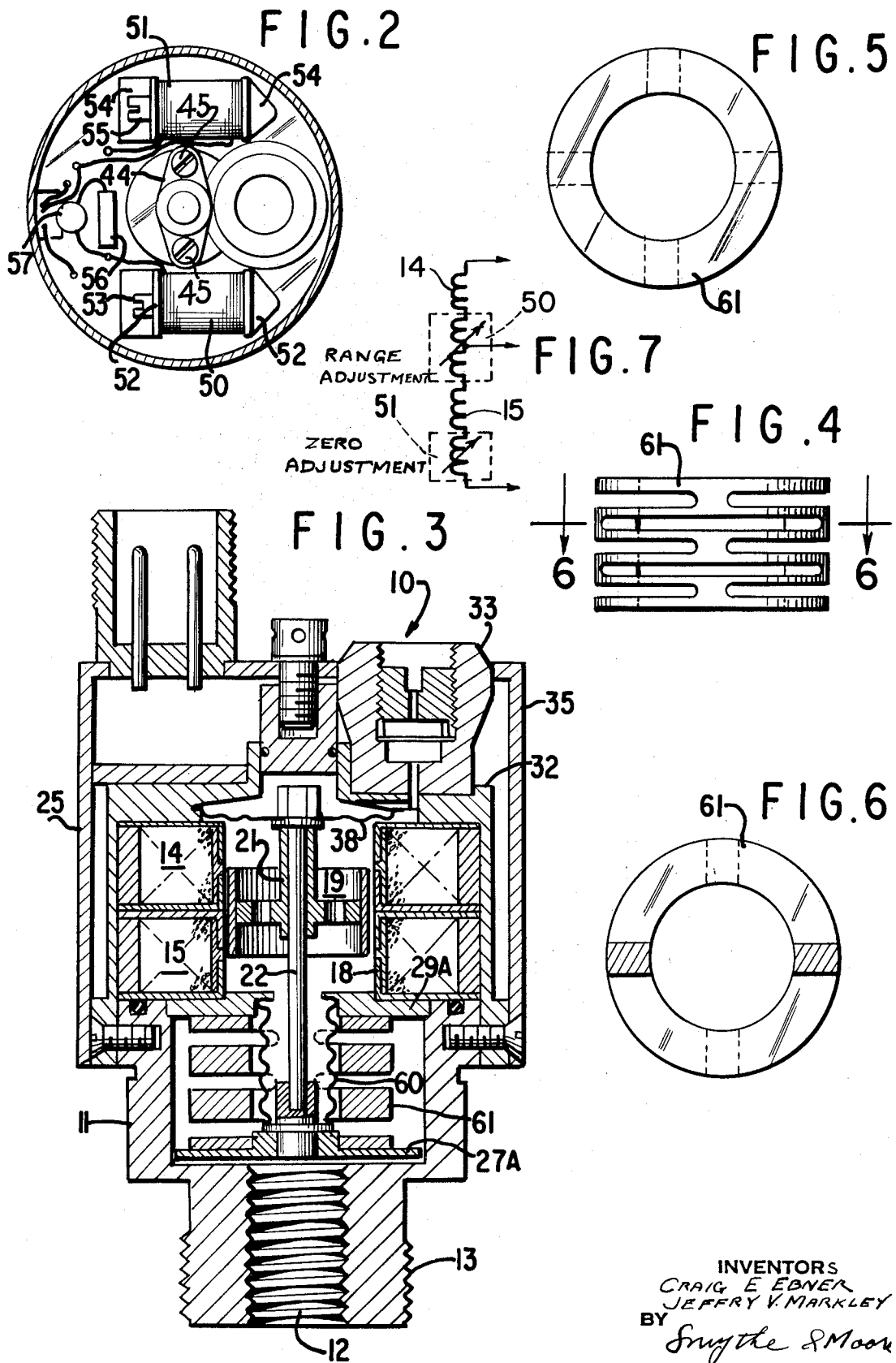

VARIABLE RELUCTANCE TRANSMITTER

Various systems have been proposed for use on aircraft for monitoring functions such as oil, fuel and hydraulic pressure. One such system is a variable reluctance remote pressure indicating system which essentially comprises a transmitter mounted either on the engines or in the wing depending upon the application, and an indicator which is mounted in the cabin to display the measured pressure for the flight crew. Such a transmitter is known in the art for high pressure and low pressure applications and may comprise a bellows and spring for high pressure and a diaphragm for low pressures for the sensing element and variable reluctance coils and armature for converting the motion of the sensing element into an electrical signal to transmit to the indicator. To obtain accurate results, it is occasionally desired to adjust the voltage range which is transmitted by the movement of the armature within the coils. Setting a zero adjustment of the transmitter in order to calibrate the same is similar to varying the voltage range. Previously known variable reluctance transmitters were provided with mechanical zero adjustment of the transmitter. Thus, the transmitters could only be adjusted when the transmitters were removed from the aircraft and in the overhaul shop.

It is an object of the present invention to provide a variable reluctance transmitter whose transmitted voltage range can be adjusted remotely.

It is another object of the present invention to provide a variable reluctance transmitter having electrical means for adjusting selectively the transmitted voltage range.

In one aspect of the present invention, a linear variable reactor comprises a frame having a pair of coaxially positioned coils therein. A plurality of annular magnetic pole members are axially spaced on the inner peripheries of the coils. Armature means of magnetic material is mounted for linear movement within the annular pole members and has its peripheral surface spaced therefrom to define a magnetic air gap therebetween. Suitable sensor means can be operatively connected to the armature means to move the armature within the pole members. Electrical means are provided for selectively adjusting the voltage range transmitted by the movement of the armature within the coils. The peripheral surface of the armature means may be annular in shape and its peripheral surface may have a uniform axial dimension. The casing is arranged so that it can be easily assembled and disassembled.

Other objects, advantages and features of the present invention will become apparent from the following description and drawing, which are merely exemplary.

In the drawing:

FIG. 1 is a longitudinal sectional view of one form of the invention;

FIG. 2 is a view looking in a direction along the line 2—2 of FIG. 1;

FIG. 3 is a sectional view similar to FIG. 1 but with an alternate sensor;

FIG. 4 is a side view of the spring shown in FIG. 3;

FIG. 5 is a top view of FIG. 4;

FIG. 6 is a sectional view taken along the line 6—6 of FIG. 4; and

FIG. 7 is a schematic circuit diagram.

Proceeding next to the drawing, a specific embodiment of the present invention will be described in detail.

The transmitter according to the present invention is indicated generally at 10 and comprises a frame or base 11 in the form of a nut having a pressure sensing opening 12 and external threads 13. The threads 13 are for mounting of the transmitter as needed.

A pair of coils 14 and 15 (FIGS. 1, 2, 3, 7) are mounted coaxially upon the frame and are provided with a plurality of annular magnetic pole members 16, 17 and 18 on the inner peripheries of the coils with the pole members being axially spaced from each other as shown in the drawing.

Movably mounted within the annular pole members is a slug assembly 19 which functions as an armature and is provided with a peripheral surface 20 having a uniform axial dimension. The slug assembly 19 has a tubular portion 21 which fits closely upon a slug shaft 22. Mounted on the upper end of the tubular extension 21 is a flexure 23 held in place by a nut 24 on the outer threaded end of shaft 22. The ends of the flexure 23 are secured within a coil cup 25 as shown in the drawing.

The lower end of shaft 22 has a diaphragm 26 connected thereto between disc members 27, 28 bearing against annular shoulder 29 on 29A. The pressure admitted to the transmitter through the passage 12 acts directly on the diaphragm 26 from the direction of disc 27.

Mounted on the upper surface 32 of the coil cup 25 is a vent boss or connection 33 which extends through an opening 34 in the case 35 enclosing the coils. The vent boss 33 communicates through a passage 38 in the coil cup and to the underside of the flexure 23 which is mounted in a chamber 39. The upper surface of the coil cup 25 is provided with an opening 40 which communicates with the upper portion of the chamber 39. The opening 40 is defined by an upwardly extending boss 41 within which is received an access plug 42 having an O-ring 43 at its lower end. The access plug 42 is provided with a base 44 (FIG. 2) having a pair of openings therein to accommodate screws 45 (FIG. 2) to secure the access plug in position in opening 40.

The access plug is provided with a threaded bore 46 which receives a screw 47 passing through an opening 48 in the case 35 to secure that case in position upon the coil cup. A gasket 49 as seen in FIG. 1 may be interposed between the upper surface of the access plug 42 and the inner surface of the case 35 surrounding the screw 47.

Mounted on the upper surface 32 of the coil cup 25 is a range adjusting coil 50 and a zero adjusting coil 51 as may be seen in FIG. 2. Coil 50 is mounted between a pair of angle members 52 and is adjusted by means of adjusting screw 53. In a similar manner, the zero adjusting coil 51 is mounted between angle brackets 54 and is provided with an adjusting screw 55. Electrically connected to the adjusting coils is a resistor 56 and a thermistor 57.

An electrical connector 58 is mounted in the upper surface of the casing 35 and is connected electrically to the coils 50 and 51 and to the coil assembly including coils 50 and 51 to transmit electrical signals in response to the movement of the slug assembly under the action of fluid pressure against the bottom surface of diaphragm 26.

Adjusting of the coils 50 and 51 (FIGS. 2, 7) by the screws 53 and 54, respectively, adjusts selectively the voltage range transmitted by the movement of the armature within the coils. It is also possible to provide for manipulation of the electrical adjusting means from a remote position to calibrate the transmitter when it is in operation. The electrical adjusting means varies the relationship between the slug assembly and the pole members so as to vary the zero starting positions. The use of the electrical adjusting means eliminates the necessity for requiring physical access to the transmitter in order to adjust or calibrate the same. FIG. 7 is a schematic showing of the circuit involving coils 50 and 51.

Removal of the access plug 42 permits coarse mechanical zero adjustment of the device at time of initial manufacture.

The transmitter, as illustrated in the drawing and described above, is for low pressure sensing. The transmitter can be converted into a high pressure sensor by replacing the sensor assembly comprising the diaphragm by a suitable high pressure sensor assembly comprising a bellows and spring as illustrated in FIG. 3.

In the transmitter of FIG. 3, the diaphragm 26 is replaced by a bellows 60 and a spring 61. The spring 61 is of the square or box type and is shown in greater detail in FIGS. 4-6. The base plate 27 is replaced by a somewhat larger base plate 27A which is engaged by one end of the spring 61. The other end of the spring 61 bears directly against the base 29A of the coil cup 25.

In operation, the transmitter of FIG. 3 functions in the same manner as the transmitter described above but operates over a higher pressure range.

It will be understood that various details of construction and arrangement of parts may be made without departing from the spirit of the invention except as defined in the appended claims.

What is claimed is:

1. A linear variable reluctance transmitter comprising a frame means, a pair of coils coaxially positioned on said frame means, a plurality of annular magnetic pole members on the inner peripheries of said coils and axially spaced from each other, armature means of magnetic material of constant axial length around its periphery mounted for linear movement within said annular pole members and spaced therefrom to define a magnetic gap therebetween, pressure responsive means connected to said armature means to move said armature means rectilinearly within said pole members upon change of pressure, range adjusting coil means electrically connected to said pair of coils and located on said frame means, zero adjusting coil means electrically connected to said pair of coils and located on said frame means, said range adjusting coil means and said zero adjusting coil means being adjustable so as to set the zero point and the voltage range transmitted by said coil means as the armature moves, and electrical connector means for connecting the signal from said pair of coils and said zero and range coils connected therewith to a signal receiving means.

2. A linear variable reluctance transmitter as claimed in claim 1 and comprising a cup-shaped casing enclosing said annular magnetic pole members and said armature means, there being an opening in said casing and an access plug removably mounted in said casing opening, and including a second casing enclosing said first casing and having one end spaced from an end of the first casing, said electrical adjusting means being mounted on the end of said first casing within said space.

* * * * *